J. A. H. HATT.
PHOTOMECHANICAL SCREEN AND PROCESS OF MAKING SAME.
APPLICATION FILED OCT. 11, 1916.

1,317,493.  Patented Sept. 30, 1919.

WITNESSES:
INVENTOR
J. A. H. Hatt
BY
John D. Morgan
ATTORNEYS

UNITED STATES PATENT OFFICE.

JOSEPH ARTHUR HENRY HATT, OF BROOKLYN, NEW YORK.

PHOTOMECHANICAL SCREEN AND PROCESS OF MAKING SAME.

1,317,493.      Specification of Letters Patent.      Patented Sept. 30, 1919.

Application filed October 11, 1916. Serial No. 124,954.

*To all whom it may concern:*

Be it known that I, JOSEPH ARTHUR HENRY HATT, a citizen of the United States, and a resident of Brooklyn, in the county of Kings and State of New York, have invented certain new and useful Improvements in Photomechanical Screens and Processes of Making Same, of which the following is a specification.

The invention relates to a screen and to a process for making screens such as are used in photo-mechanical engraving, and in certain of its aspects more especially to grain screens, or those having an irregular grain figure.

Objects and advantages of the invention will be set forth in part hereinafter, and in part will be obvious herefrom, the same being attained through the steps, means and instrumentalities pointed out herein, and more particularly in the appended claims.

The invention consists in the novel steps, processes, articles, combinations and improvements herein shown and described.

The accompanying drawings, herein referred to and constituting a part hereof, are more or less diagrammatic in character, but serve to illustrate an embodiment of the invention, and together with the description, serve to explain the principles thereof.

Of the drawings:—

In the preferred manner of carrying out my invention, and referring in particular to the diagrammatic illustration of the drawings, a transparent support, such as a plate 1 of plane and polished glass is thoroughly cleaned by washing, the washing being preferably through an alkaline solution, such as a solution of potash, and also through a weak acid solution, such as a very dilute solution of nitric acid. The plate is then carefully rinsed in water.

The clean plate is then coated with a solution which is sensitive to the action of light, and preferably with a solution the solubility of which is changed or modified by the light action. For this purpose I prefer a colloidal solution carrying a chromic salt. A suitable solution is made by mixing cabinet glue and Le Page process glue in various proportions, to which albumin may also be added in relatively small proportion. The coating solution is sensitized with a suitable substance, such as potassium bichromate. The sensitized solution is applied to the surface of the glass plate by pouring thereon and spreading in a thin, uniform layer 2 by whirling, the layer or coating being then dried adherent upon the glass plate by the application of heat.

Figure 1:
Figure 1 is a representation, in edge view, of the transparent plate with the sensitized coating thereon.
Figure 2:
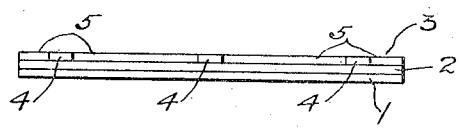
Fig. 2 is a similar view of the coated plate beneath the negative, ready for, or at the time of, exposure to light.
Figure 3:
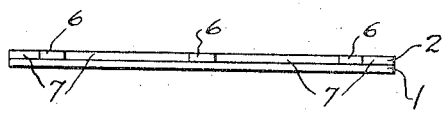
Fig. 3 is a similar view representing the effect of the light action on the light sensitive coating.
Figure 4:
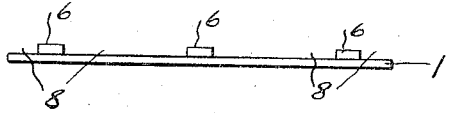
Fig. 4 is a similar view representing the plate and its sensitive coating after development.

The sensitive coating is acted upon by light in the conformation of the screen figure, and for this purpose I provide a negative 3 having light transmitting portions 4 and light arresting portions 5 corresponding to the desired screen figures. It will be understood, as already indicated, that the representation in the drawings is diagrammatic and greatly magnified, as the screen figures are usually microscopic and the layer 2 exceedingly thin. The negative may be made in suitable manner, as by reproduction from a similar negative or positive, or by photographing from a drawing or other original. The plate 1 with its sensitive layer 2 may be exposed to the light with the negative 3 in direct contact therewith. The action of the light upon the light-sensitive layer 2 where it is transmitted thereto through the light-transmitting portions of the negative 3, is to render such portions of the layer 2 insoluble, or relatively insoluble, with respect to the other parts of the coating 2. In Fig. 3 of the drawings the relatively insoluble parts of the layer 2 are indicated by 6 and the relatively soluble parts by 7. The plate is then immersed in water to dissolve away the soluble parts 7 of the colloidal coating, leaving the corresponding portions 8 of the glass plate 1 clear, transparent and unobstructive to the passage of light.

The screen plate 1 with its grain, or other screen figure, coating 6 may be immersed in, or have otherwise applied thereto, a pigmentous medium, preferably a solution of an acid anilin dye, or it may be immersed in a plurality of dyes so as to secure different color effects or different degrees of translucency or light obstructiveness for different kinds of work.

There is thus provided by a simple, certain and inexpensive process a photo-mechanical screen having the desired, and for first-class work, the essential, property of substantially perfect uniformity in texture, sharpness and clearness of the screen figures, having perfect transparency in the light-transmitting portions, and having the light obstructive figures of any desired degree of translucency or opacity, and being of uniform translucency and opacity throughout the entire screen, and having combined therewith the capability of imparting color, or colors, to the screen figures, and thereby imparting a desired or selected color effect to the entire screen.

Figure 5:
Fig. 5 is a similar view representing the screen after the residual layer has been impregnated with a pigmentous medium, and showing a cover glass applied thereto.
Figure 6:
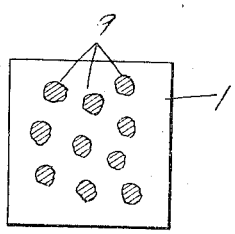
Fig. 6 is a bottom plan, referred to the preceding figures, diagrammatic and largely magnified, of a grained screen.

The pigmented screen figures are indicated in Fig. 5 by reference numeral 9. A cover screen 10 may be applied to the screen for protection against dirt and damage in a well known manner.

From all the foregoing it will be understood that a photo-mechanical screen and process of producing same has been provided realizing the objects and advantages herein pointed out together with other objects and advantages, which in part will be obvious and in part may be learned from practice of the invention. It will be further understood that changes may be made from the precise description and procedure set forth herein, without departing from the principles of the invention, and without sacrificing its chief advantages.

What I claim as my invention and desire to secure by Letters Patent is:—

1. The process of producing a photo-mechanical screen which comprises applying to a transparent plate a light-sensitive layer, changing the solubility of said layer in conformation with the desired screen figure by the action of light, and dissolving the relatively soluble portions of said layer to provide minute transparent, light transmitting areas between the screen figures formed by the undissolved layer.

2. The process of producing a photo-mechanical screen which comprises applying to a transparent plate a pigmentously receptive layer, removing said layer entirely from the transparent plate in conformity with a desired screen figure to provide minute transparent, light-transmitting areas between the screen figures formed by the undissolved layer, and pigmentizing the portions of said layer remaining adherent upon the transparent plate.

3. A photo-mechanical screen comprising a transparent plate having adherent thereon a layer in conformity of a screen figure, and having clear, transparent areas between the screen figures, said layer being impregnated with a pigment.

In testimony whereof I have signed my name to this specification in the presence of two subscribing witnesses.

JOSEPH ARTHUR HENRY HATT.

Witnesses:
CHARLES JOHNSON,
LOUISA LOEHR.